United States Patent [19]
Chen et al.

[11] Patent Number: 5,940,456
[45] Date of Patent: Aug. 17, 1999

[54] SYNCHRONOUS PLESIOCHRONOUS DIGITAL HIERARCHY TRANSMISSION SYSTEMS

[75] Inventors: Robert Xuebo Chen, Holmdel, N.J.; William Xiao-Qing Huang, Piedmont, Calif.

[73] Assignee: UT Starcom, Inc., Oakland, Calif.

[21] Appl. No.: 08/667,168

[22] Filed: Jun. 20, 1996

[51] Int. Cl.[6] ........................................ H04L 7/00
[52] U.S. Cl. .................. 375/356; 370/516; 370/535; 370/537; 370/538; 370/539; 370/540
[58] Field of Search ................... 370/516, 537, 370/538, 539, 540, 541; 371/1, 46, 47.1; 375/356, 371; 359/136, 152, 158

[56] References Cited

U.S. PATENT DOCUMENTS

| | | | |
|---|---|---|---|
| 4,754,456 | 6/1988 | Yato et al. | 370/541 |
| 4,759,018 | 7/1988 | Buchner | 370/537 |
| 5,040,170 | 8/1991 | Upp et al. | 370/358 |
| 5,101,292 | 3/1992 | Burghardt et al. | 359/135 |
| 5,185,736 | 2/1993 | Tyrrell et al. | 370/358 |
| 5,319,637 | 6/1994 | Taniguchi et al. | 370/537 |
| 5,323,399 | 6/1994 | Kurano | 370/540 |
| 5,577,049 | 11/1996 | Ito | 370/537 |

FOREIGN PATENT DOCUMENTS

| | | | |
|---|---|---|---|
| 0 220 808 A2 | 6/1987 | European Pat. Off. | H04J 3/16 |
| 3501674A1 | 7/1986 | Germany | H04L 5/22 |

OTHER PUBLICATIONS

Conner, G. et al., "TAXI Chipset Replaces Multi–Wire Buses with a Single, Serial Link", Electronic Engineering, vol. 59, No. 724, Apr. 1997, UK, pp. 51–59.

*Primary Examiner*—Stephen Chin
*Assistant Examiner*—Joseph Roundtree
*Attorney, Agent, or Firm*—Wilson, Sonsini, Goodrich & Rosati

[57] ABSTRACT

A system that allows multiple bundles of plesiochronous digital hierarchy (PDH) payload data streams to be synchronously trasmitted from one point to another is described. The system multiplexes multiple stages of the PDH using a single clock signal. This removes the need to perform stuffing and de-stuffing of the data streams at the various stages of the multiplexing.

10 Claims, 10 Drawing Sheets

SYNCHRONOUS PLESIOCHRONOUS DIGITAL HIERARCHY TRANSMISSION SYSTEMS

FIELD OF THE INVENTION

The present invention relates to telecommunications, and more particularly, to systems that allow multiple plesiochronous digital hierarchy payload data streams to be synchronously communicated using fiber optical transceivers.

BACKGROUND OF THE INVENTION

Telecommunications is one of the most important forces that drive the economic development of this world. Various telecommunication services (e.g., voice, electronic mail, facsimile, etc.) help people in all parts of the world to communicate almost instantaneously. When information can be exchange reliably, quickly and inexpensively, the efficiency of many organizations and business transactions improve drastically.

As a result of the needs for global communication, telecommunication services have evolved rapidly from a collection of separate, and largely incompatible, systems towards a universal network, in which a wide variety of services are integrated using a common digital form of transmission. The way to build this universal network is for all systems to follow a set of standards. One of the most important standard-setting bodies is the International Telecommunications Union ("ITU"). The part of the ITU responsible for setting standards is the ITU Telecommunications Standardization Sector ("ITU-T"), which used to be known as the International Telegraph and Telephone Consultative Committee ("CCITT"). Many of the standards referred to in this specification were set by CCITT.

It is known that over any given communication route, the most cost-effective transmission of telecommunication signal will, in general, be achieved by multiplexing as many communication channels as possible using a device called multiplexer. The multiplexed signal can be transmitted over a single communication link using a high signalling rate. As a result, a single link (which could be a electric wire, optical fiber, microwave transceiver, etc.) can carry communication signals of hundreds of users.

Transmission networks in the public switched telephone network, therefore, are designed around hierarchies of transmission rates, corresponding to increasing numbers of channels conveyed on a single multiplexed link. These hierarchies are defined in national and international standards (such as the CCITT). In Europe the hierarchy is based on a 30-channel 2048 kilo-bits per second ("kbps") primary rate (called a "E1" rate), while in the United States and Japan it is based upon a 24-channel 1544 kbps rate (called a "T1" rate). Examples of other rates are the 8448 kbps E2 rate (corresponding to four E1 channels), 34368 kbps E3 rate (corresponding to four E2 channels), and 139264 kbps E4 rate (corresponding to four E3 channels). The interconnection between successive multiplexers or to and from transmission systems are made using standardized interfaces, defined by CCITT in recommendation G.703. The signal structure at these interfaces is also standardized. As a result, telecommunications companies can build and reconfigure the transmission network on a modular basis, with different modules purchased from different vendors.

The CCITT recommendation allows for bit-rate tolerances at each level of the hierarchy. To maintain signals within these tolerances, each multiplexer contains a clock source. At higher order multiplexers, the incoming ("tributary") signals are originated at lower order multiplexers, each with its own clock source. As a result, the tributaries each has a different bit rate, although all should be within the specified tolerance. Such signals, having nominally the same frequency but differing within a defined tolerance, are called "plesiochronous" signals. The digital hierarchy involving these signals is called the "plesiochronous digital hierarchy" ("PDH").

One of the most important communication media is fiber optic because it can transmit signals having an extremely high signalling rate and is immune to many sources of noise. Optical Link Integrated Multiplexing Terminals (or "OPTIMUX") are major building blocks for building fiber optical based telecommunication infrastructure. Because most digital interfaces used internationally are based on the G.703 E1 standard, one of the most popular product categories in this area is the PDH multiplexing and transmission devices. These OPTIMUX products multiplex E1 signals into higher bit rates (e.g., E2 and E3 rates) according to PDH multiplexing hierarchy governed by G.742 and G.751 and directly convert the resultant higher tributary data streams into optical signals for transporting over optical fiber links. They are currently the most cost effective and easy to maintain transmission products on the market today.

As a result of the plesiochronous nature of the PDH, there is a need to synchronize the tributary signals. Typical methods involve adding justification or stuffing bits to the data streams. These additional bits occupy valuable bandwidth of a network. Further, complicated circuits are needed to process these bits and perform synchronization. In addition, the hierarchy must be followed rigidly (e.g., a multiplexed signal is generated from four tributary signals having the same rate which is one level lower in the hierarchy). Consequently, there is a need to design a system which can overcome these problems.

SUMMARY OF THE INVENTION

The present invention involves a system that allows multiple bundles of plesiochronous digital hierarchy payload data streams to be synchronously transmitted from one point to another. This system is called "synchronous plesiochronous digital hierarchy." Prior art plesiochronous digital hierarchy system relies on stuffing and de-stuffing. Synchronous plesiochronous digital hierarchy is based on the observation that if all stages of PDH multiplexing are accomplished in a single device, there is no need to perform these stuffing and de-stuffing processing at every stage of the multiplexing. This is because from the first stage (e.g. E1/E2 multiplexing) on, all tributaries can share the same clock source in the system.

In the synchronous plesiochronous digital hierarchy system, the first stage of the multiplexing, which the user devices are directly connected to, is regular plesiochronous digital hierarchy. These will allow the system to accommodate the phase variation of various tributary inputs. After the first stage, all the tributaries at higher level multiplexing are synchronized.

Once the tributaries are synchronously multiplexed, they can be transmitted to the remote locations using electrical, optical fiber, or any other means or media. The result is a simple, flexible, and more reliable transmission system for voice and data communications.

The present invention is also directed to a novel "add and drop" system. Once the multiple plesiochronous digital hierarchy data streams have been synchronously multiplexed with a single clock it is possible to add and drop one or more of the plesiochronous digital hierarchy data streams. Compare to the prior art add and drop configuration, the present invention involves only one multiplexer at any given location where data is added or dropped from the main transmission facility using the above mentioned synchronous plesiochronous digital hierarchy. The add and drop feature is very important in the telecommunication deployment where the equipment in the middle acts as a repeater for the down stream equipment and at the same time serve the users around the area. Further, the add and drop feature allows a self-healing ring to be implemented.

These and other features of the present invention will become apparent from the following description when read in conjunction with the drawings and the appended claims.

DETAILED DESCRIPTION OF THE INVENTION

The present invention comprises a novel communication system and related methods. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
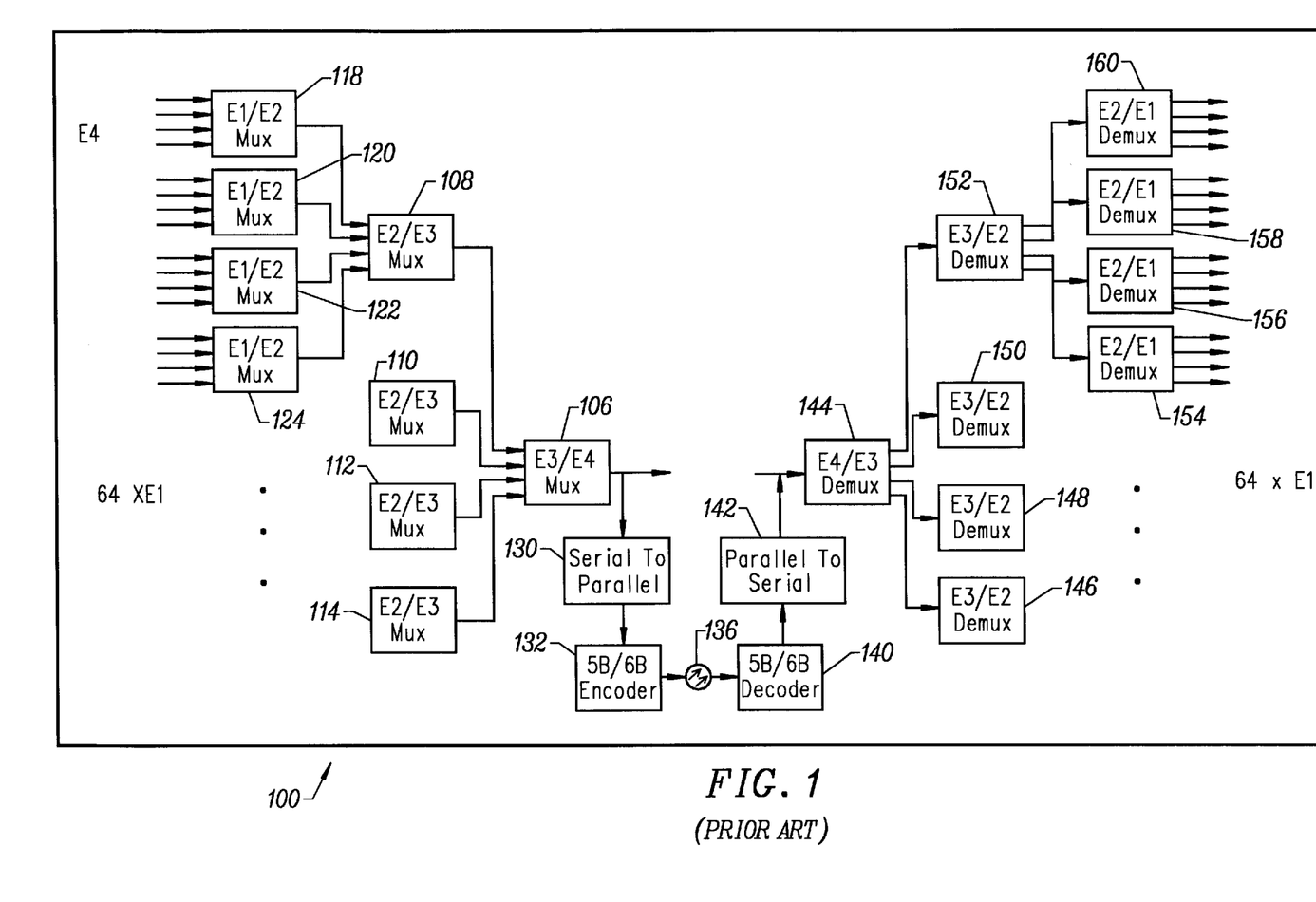
FIG. 1 is a block diagram of a prior art multiplexing system.

Before the present inventive system is described, it will be advantageous to provide a brief description of prior art PDH systems. FIG. 1 shows a prior art multiplexing system 100 used in PDH transmission. This system can multiplex sixty four E1 data streams into a single E4 data stream. System 100 shows a E3 to E4 multiplexer (i.e., "E3/E4 mux") 106 which accepts four E3 data streams to generate one E4 data stream. These E3 data streams are obtained from four E2/E3 muxes, shown in FIG. 1 as numerals 108, 110, 112 and 114. Each E2/E3 mux accepts four inputs, one from a E1/E2 mux.

In FIG. 1, four E1/E2 muxes, shown as numerals 118, 120, 122 and 124, are coupled to the inputs of E2/E3 mux 108. Each E1/E2 mux accepts four E1 data streams. As a result, sixty four E1 data streams are multiplexed, in a cascaded fashion, into an E4 data stream.

The output of E3/E4 mux 106, which is a serial E4 data stream, is connected to a serial-to-parallel converter 130 for converting it into parallel data. The parallel data is sent to a mB/nB digital CODEC encoder 132, which converts the parallel data into a serial data stream. This serial data stream can be transmitted over a fiber optical cable 136.

The fiber data stream can be converted back to sixty four E1 data streams. System 100 comprises a mB/nB digital CODEC decoder 140 which receives serial data from fiber optical cable 136 and converts it into parallel data. The parallel data is coupled to a parallel-to-serial convert 142 which generates an E4 data stream. The E4 data stream is coupled to an E4/E3 demux (demultiplexer) 144 which converts the E4 data stream into four E3 data streams. The output of the four E3 data streams are coupled to four E3/E2 demuxes, shown in FIG. 1 as numerals 146, 148, 150 and 152. Each E3/E2 demux is connected to four E2/E1 demux. For example, E3/E2 demux 152 is connected to E2/E1 demuxes 154, 156, 158 and 160. Each E2/E1 demux demultiplexes an E2 data stream into four E1 data streams. As a result, the output of system 100 contains a total of sixty four E1 data streams. Each E1 data stream generated by the E2/E1 demuxes is the same as a corresponding E1 data stream sent to a E1/E2 mux.

It can be seen in the above prior art PDH system that although the standard interface is E1 in many applications, the system still has to perform E1/E2, E2/E3 and/or E3/E4 multiplexing so as to get to the high transmission speed. Similarly, the high speed transmission data stream has to be demultiplexed sequentially into the standard E1 interface. As a result, there is a lot of unnecessary processing, which leads to lower performance and higher costs.

Figure 2A:
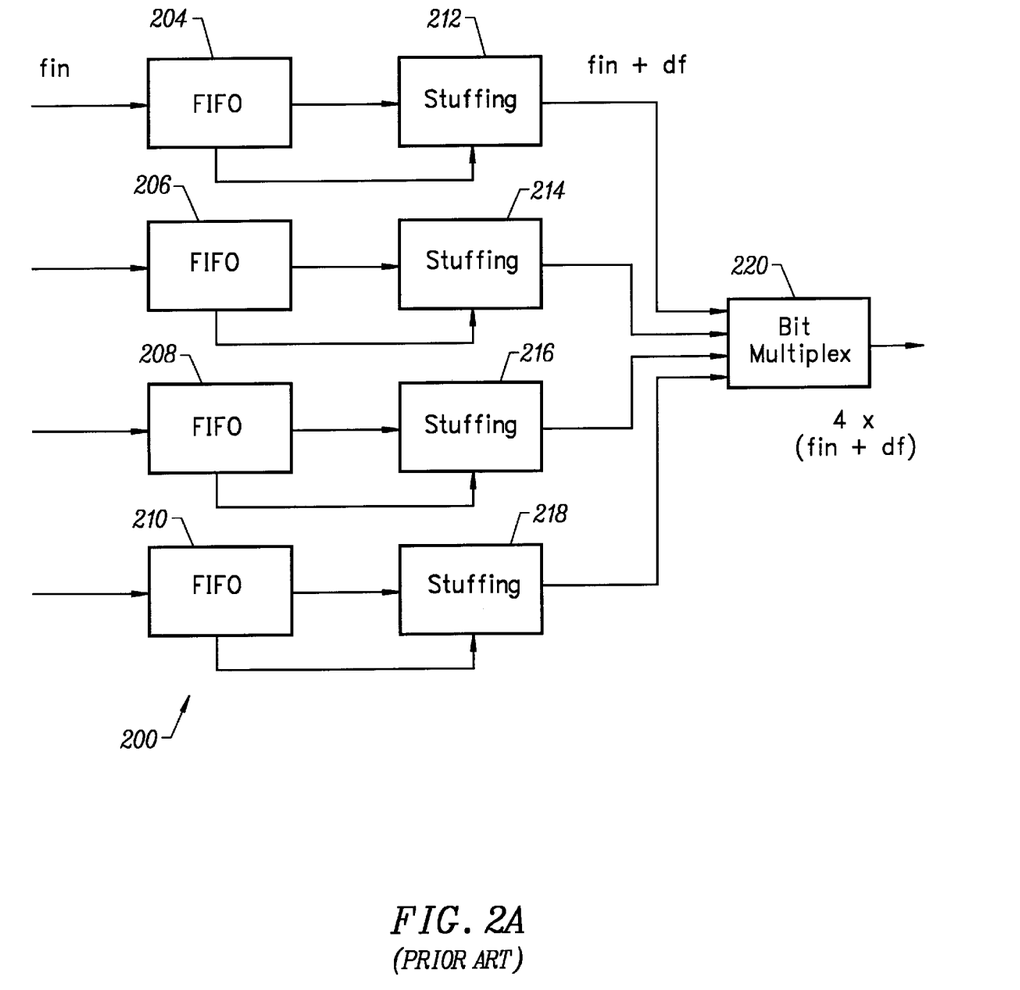
FIGS. 2A and 2B are block diagrams of a prior art stuffing and de-stuffing arrangements that can be used in the prior art multiplexing system of FIG. 1.
Figure 2B:
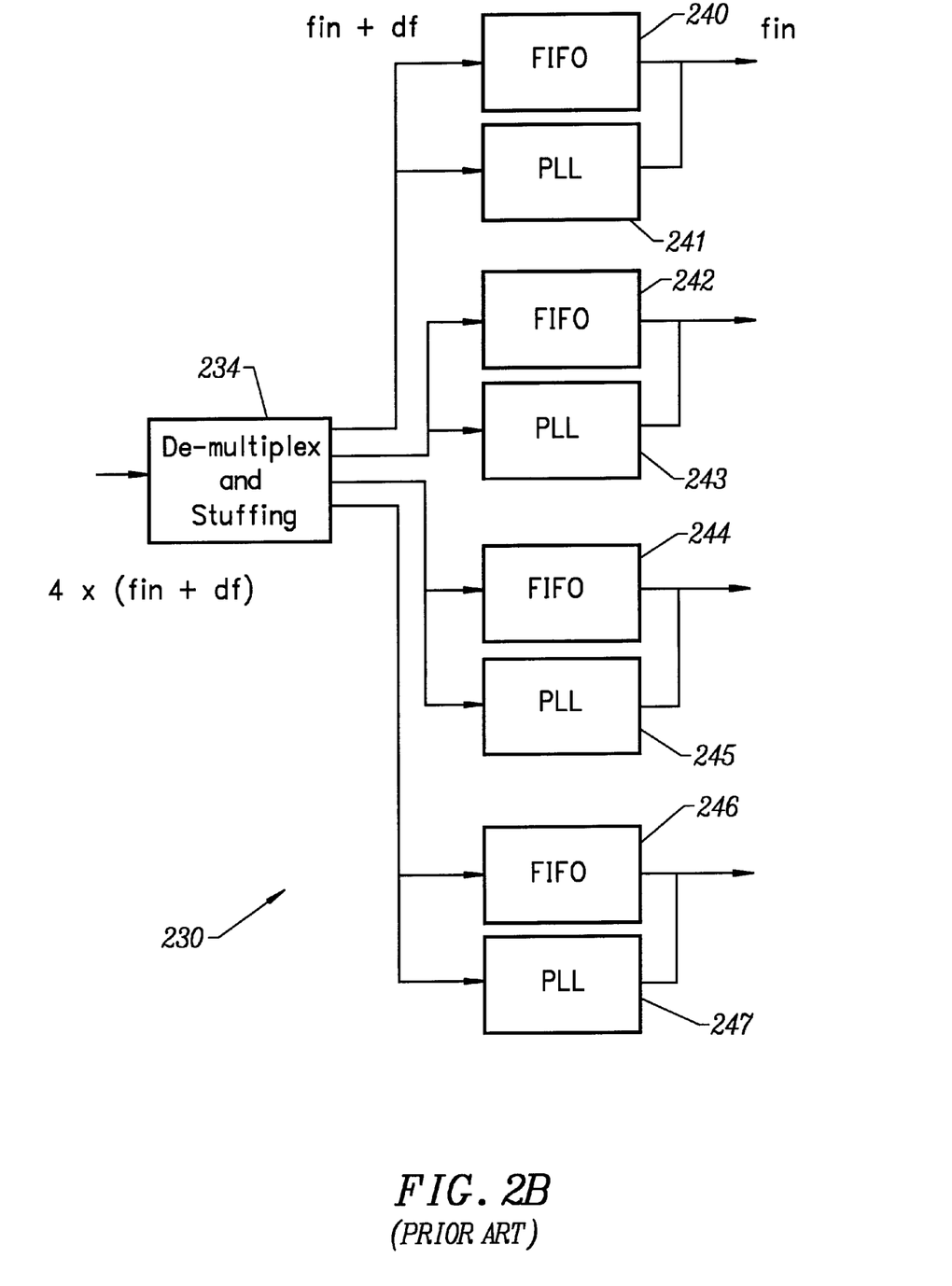

One of the characteristics of PDH is that the tributary inputs are not synchronized. In each of the multiplexing stages, the tributary input data streams can have different phases (not phase coherent), although they have exactly the same frequency. In order to multiplex these tributary data streams, it is necessary to synchronize the data streams. Conventional PDH uses a process called stuffing (or justification) to synchronize the four tributary signals so that they can be bit multiplexed at a slightly higher bit rate than the original signals. At the receiving side, a de-stuffing process is performed at each demultiplexing stage for each of the tributary signals so that the frequency of the signals is equal to that of the original signals. FIG. 2A shows a block diagram of a stuffing arrangement 200 in a multiplexer and FIG. 2B shows a block diagram of a de-stuffing arrangement 230 in a demultiplexer. Stuffing arrangement 200 comprising four first-in-first-out ("FIFO") buffers (shown as numerals 204, 206, 208 and 210) each coupled to an input data stream (which could be E1, E2 or E3). The outputs of the FIFOs are each coupled to a stuffing circuit (numerals 212, 214, 216, and 218). The output of the four stuffing circuits are coupled to a multiplexing circuit 220. The output of multiplexing circuit 220 is a stuffed data stream.

The de-stuffing arrangement 230 is now described. A stuffed data stream is first demultiplexed and de-stuffed by a de-multiplexer and de-stuffing circuit 234. As a result of demultiplexing, four output data streams are generated. Each de-stuffed data stream is coupled to a FIFO and a phase lock loop ("PLL") to generate a correctly decoded data stream.

FIG. 2B shows four FIFOs 240, 242, 244, and 246 associated with four PLLs 241, 243, 245 and 247.

This stuffing and de-stuffing processes are complicated and difficult to implement because they include multiple FIFOs and PLLs. It is particularly difficult to implement in the E3/E4 multiplexing and demultiplexing stages where the PLLs and FIFOs have to work at 35 Mhz frequency range with very stringent jitter performance requirements.

Figure 3:
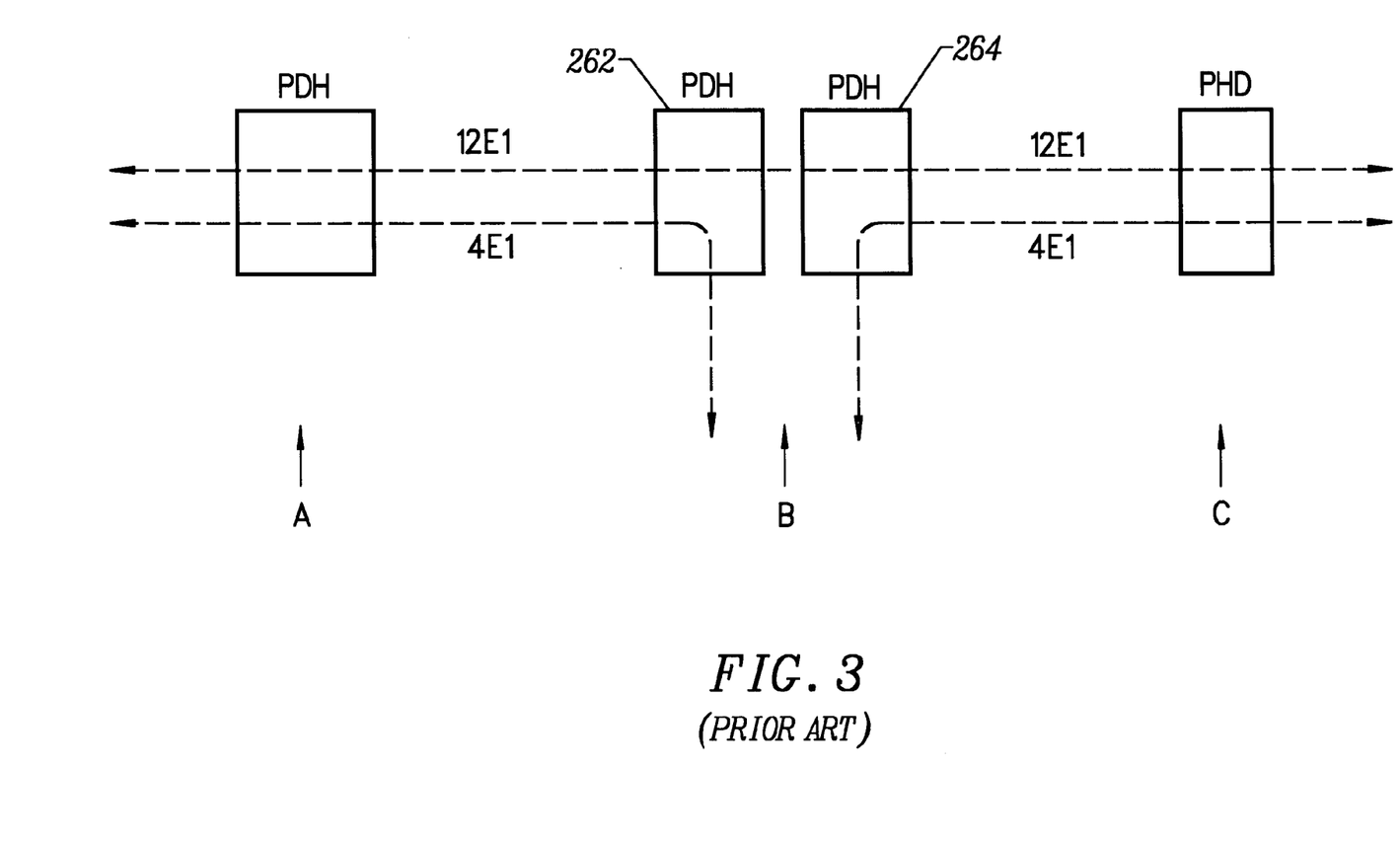
FIG. 3 is a block diagram of a prior art "add and drop" arrangement.

Another problem with this method of multiplexing relates to transmission system design. The PDH multiplexing can only be used in a point-to-point transmission, i.e., all the payload carried on the system can only goes to a single destination. However, in many applications, one destination may not need all the bandwidth that the system can carry. In these cases, it is desirable to be able to "drop" communication channels at that destination. Further, it is desirable to be able to add communication channels to a communication link having unused bandwidth. FIG. 3 shows a communication system having an add and drop capability. Three locations, designated as A, B, and C, are shown in FIG. 3. A total of 16 E1 channels originates from location A. At location B, 4 E1 channels are terminated (i.e., dropped) while 12 E1 channels are carried to location C. Because the communication link between locations B and C can carry 16 E1 channels, it is possible to add 4 new E1 channels at location B. As can be seen from FIG. 3, two pairs of PDH multiplexing systems are needed to accomplish these operations. In the "drop" operation, a PDH multiplexer system 262 at location B has to demultiplex all the way down to the E1 level to extract the payload that is to be terminated. The PDH multiplexer system 264 then multiplexed the rest of the E1 channels to E3 or E4 for transmission to location C. Similar operations need to be performed for add operation. It can be seen that it is very cumbersome to perform "add and drop" operations in prior art PHD systems.

In order to solve the above mentioned problem (and other problems), another ITU-T digital hierarchy called SDH (Synchronous Digital Hierarchy) was developed. In SDH, it is not necessary to do the multiplexing and demultiplexing all the way to E1 to extract the payload data. Due to a synchronized transmission scheme, the tributary data can be easily identified within the aggregate high speed data stream.

However, the ITU-T Synchronous Digital Hierarchy (SDH) still requires the above mentioned stuffing and de-stuffing processes so as to accommodate the same PDH payload traffic. Further, SDH is more complicated because it uses "byte" multiplexing instead of "bit" multiplexing in PDH. In addition, SDH uses a more complicated process called pointer process to accommodate all kinds of systems. The de-synchronization process has to accommodate and smooth out the byte-wide gaps in the de-multiplexed tributary data streams. The process needs to use digital, as well as analog PLLs. The result is a very expensive system that accomplishes (in many applications) not much more than a simple PDH multiplexer can do.

Figure 4:
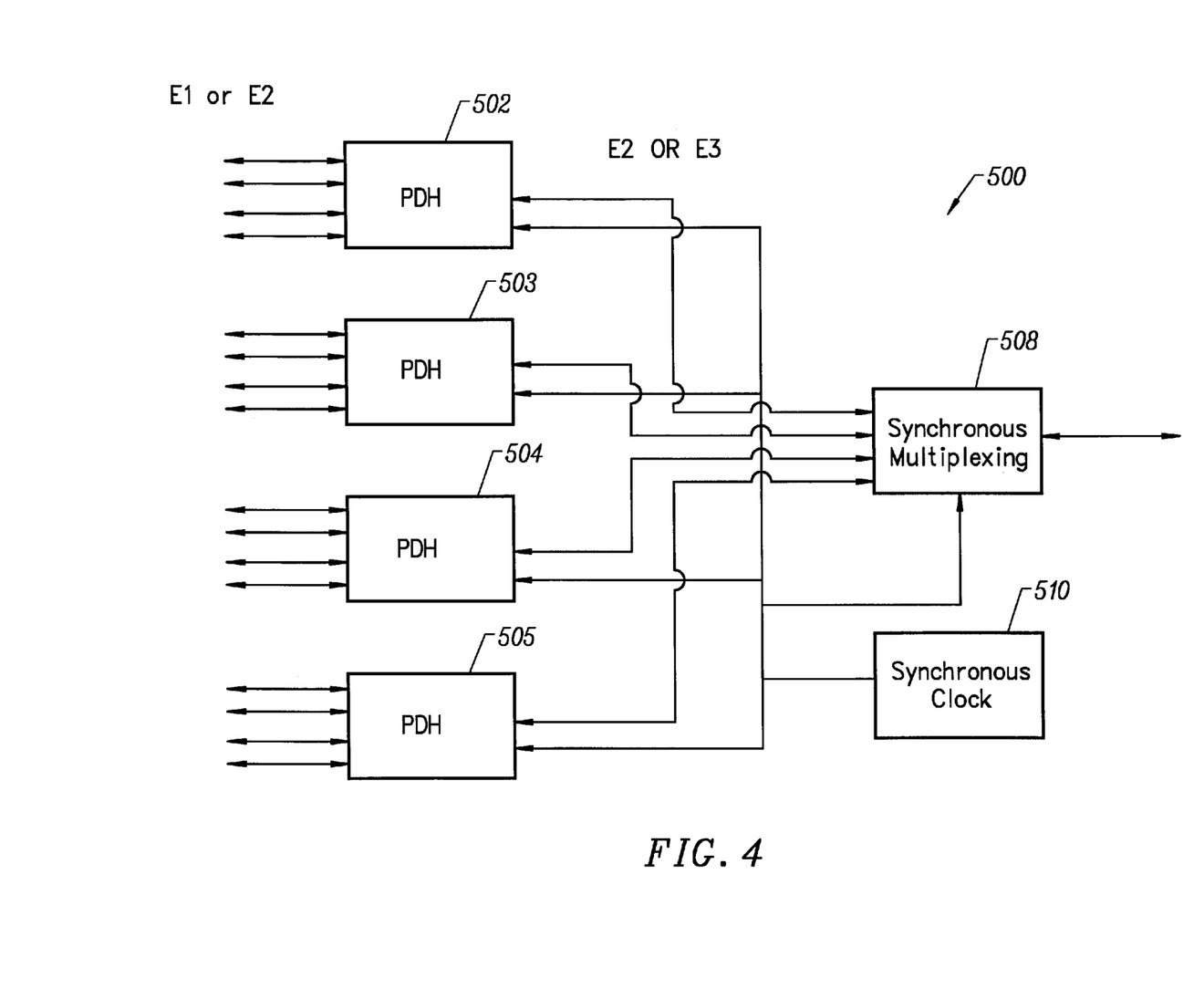
FIG. 4 is a block diagram of a synchronous plesiochronous digital hierarchy system of the present invention.

FIG. 4 is a block diagram of a "synchronous PDH" (or "SPDH") system 500 of the present invention. SPDH is based on the observation that if all stages of PDH multiplexing are accomplished in a single device, there is no need to do these stuffing and de-stuffing processing at every stage of the multiplexing. This is because from the first stage (E1/E2 multiplexing) on, all tributaries can share the same clock source in the system.

SPDH system 500 contains a plurality of PDH multiplexers (such as PDH multiplexers 502–505) in the first stage of multiplexing. The user ports of these multiplexers are connected to user PDH devices. As a result, system 500 can accommodate the phase variation in various tributary inputs. For example, if the inputs are at E1 level, then the E1/E2 multiplexing is done using PDH multiplexers 502–505. Similarly, if the inputs are at E2 level, then the E2/E3 multiplexing is done using PDH multiplexers 502–505. After the first stage, all the tributaries at higher level multiplexing (e.g., by a synchronous multiplexer 508) are synchronized. To achieve this result, system 500 contains a synchronous clock 510 which synchronizes PHD devices 502–505 and synchronous multiplexer 508. Once the tributaries are synchronously multiplexed, they can be transmitted to the remote locations using electrical, optical fiber, or any other means or media. The result is a simple, flexible, and more reliable transmission system for voice and data communications.

Figure 5:
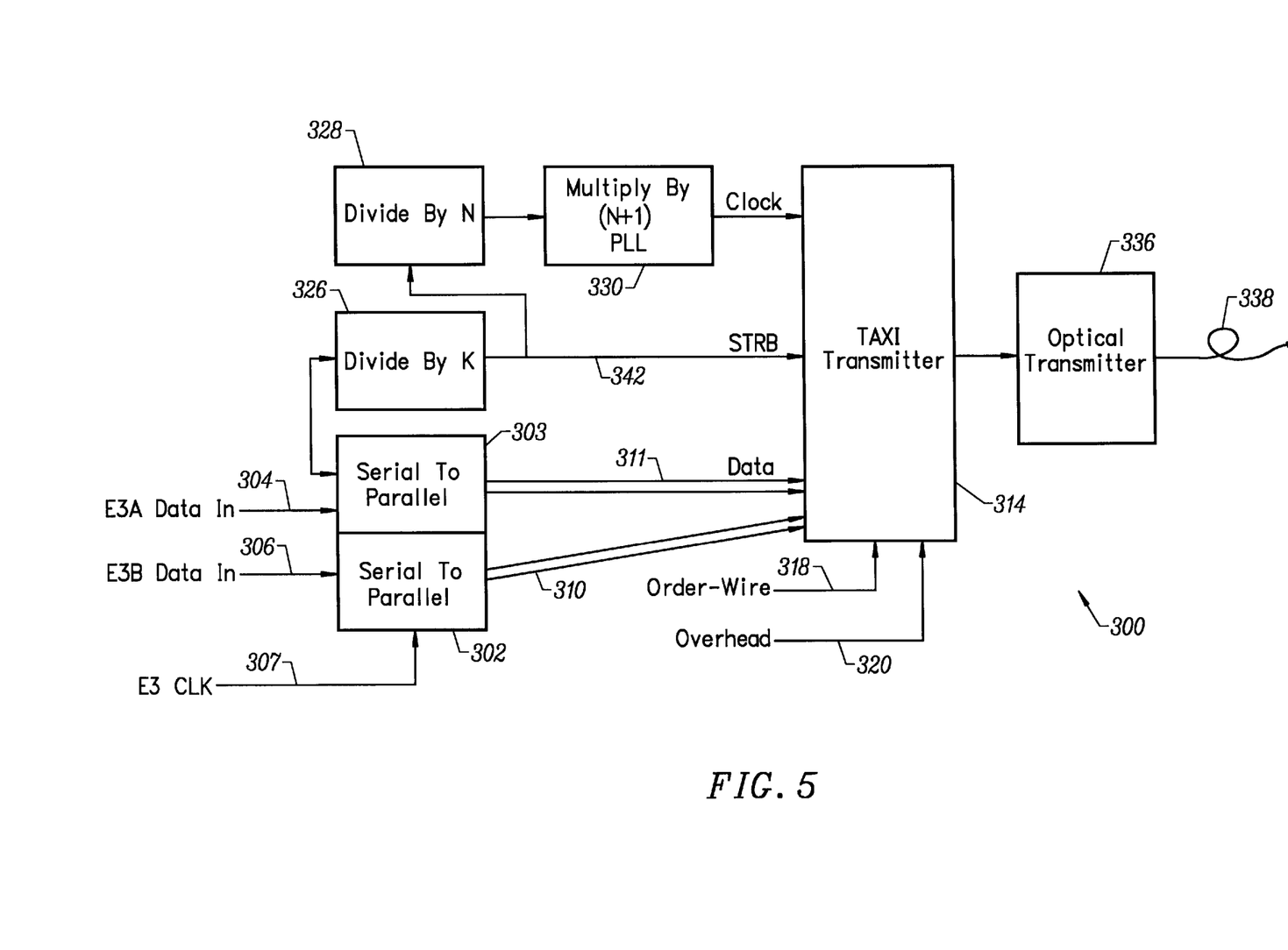
FIG. 5 is a block diagram of the transmitter portion of a synchronous plesiochronous digital hierarchy of the present invention.
Figure 6:
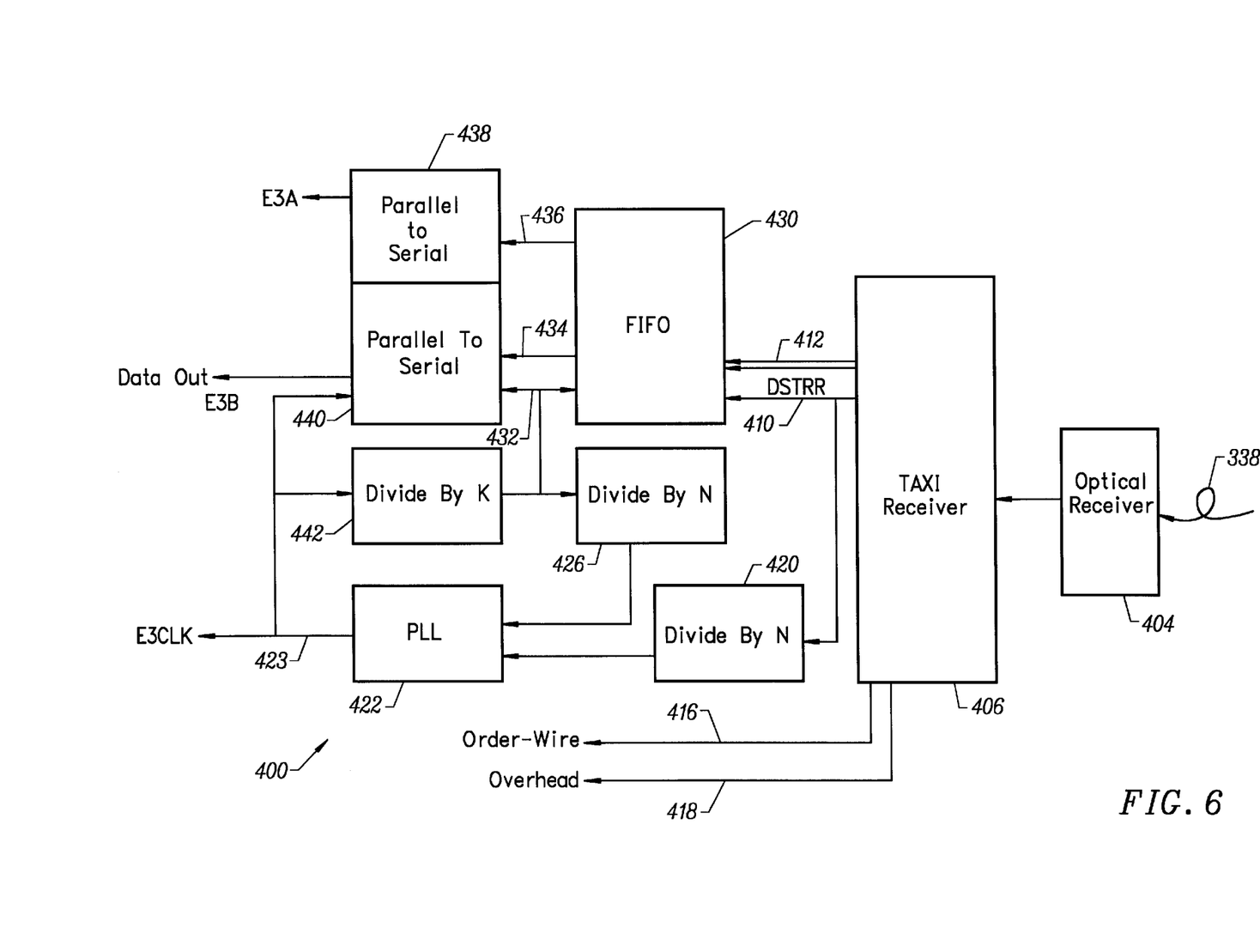
FIG. 6 is a block diagram of the receiver portion of a synchronous plesiochronous digital hierarchy of the present invention.

An exemplary embodiment of the present invention is now described. FIG. 5 shows a block diagram of the transmitter portion 300 of a PDH system of the present invention (called the "Synchronous PDH" system). FIG. 6 shows a block diagram of the receiver portion 400 of the SPDH system. The SPDH system of the present invention uses the parallel octet transmission characteristics of a mB/nB digital CODEC to bypass the final stage of multiplexing. An example of a suitable CODEC is a 5B/6B chipset manufactured by AMD called "transparent asynchronous xmitter-receiver interface", or TAXI, and having a part number of AM7968 for the transmitter and AM7969 for the receiver. The intermediate high speed tributary data stream, such as E2 or E3 data streams, are directly entered into the mB/nB CODEC as a single octet. Other overhead channel data can also be processed by the mB/nB CODEC.

Referring now to FIG. 5, transmitter portion 300 contains a serial-to-parallel circuit 302 which accepts a serial data input signals (via a line 306) and a clock signal (via a line 307). Transmitter portion 300 also contains another serial-to-parallel circuit 303 which accepts a serial data input signal on a line 304. Serial-to-parallel circuits 302 and 303 share the same clock. In FIG. 5, two E3 signals, E3A and E3B, are shown to be connected to lines 304 and 306, respectively. It should be noted that signals having other signalling rates can be coupled to lines 304 and 306. The outputs of serial-to-parallel circuits 302 and 303 are parallel data transmitted on parallel data buses 310 and 311, respectively.

Buses 310 and 311 terminate at a mB/nB CODEC transmitter 314. In the present embodiment, the CODEC is the above described TAXI transmitter. The TAXI transmitter contains two additional input lines. One of the input lines, line 318 can be used for order-wire voice communication while the other input line, line 320, can be used for overhead data communication.

The transmission of PDH digital data streams over fiber optical link requires the recovery of a jitter free clock with respect to the PDH data stream at the receiving end. If a mB/nB CODEC, such as the TAXI chipset, is used for the communication, the recovery of the jitter free clock is not always possible due to the asynchronous nature of the TAXI chipset. As a result, the present invention also includes an inventive clock generation and recovery circuit.

The be alignment operation of the TAXI chipset requires the transmitter to send a "SYNC" byte periodically so that the receiver can receive these SYNC bytes frequent enough to be able to always synchronize on the byte boundary of the 5B/6B code of the TAXI. Under this scheme, it is obvious that the transmission speed of the code rate of the CODEC must be higher than the speed with which the data is strobed into the transmitter. At the receiver side, the data output strobe is activated only when a data byte is arrived. If a SYNC byte is received, no data strobe is generated by the receiver. Thus, there is a gap between the data strobes during the reception of a SYNC byte. Depending on the differences between the data strobe rate and the CODEC transmitter clock rate, the position of these receive gaps are not always predictable. If a regular PLL circuit is used to recover a serial clock based on these gapped data strobe output signals, which is naturally derived from the PDH clock, the PLL circuit may not be able to lock at all. Because of these constraints, the PLL circuit is difficult to design and may not be stable enough to produce a low jitter clock.

In the present invention, the clock signal which is coupled to serial-to-digital circuit 302 is connected to a divide-by-K circuit 326. The output of circuit 326 is coupled to the "STRB" (i.e., strobe) input of TAXI transmitter 314 and to the input of a divide-by-N circuit 328. The output of circuit 328 is coupled to the input of a multiply-by-(N+1) PLL 330. The output of PLL 330 is connected to the "clock" input of TAXI transmitter 314.

In this arrangement, instead of letting the clock of TAXI transmitter 314 running freely, the clock is phase locked to the data strobe signal STRB. Thus, the frequency of the clock is determined at (N+1)/N times the frequency of the STRB signal. As a result, TAXI transmitter 314 will send exactly one SYNC byte and N bytes of data for every N+1 clock cycles of the clock.

The output of TAXI transmitter 314 is coupled to an optical transmitter 336, which in turn is connected to a fiber optical link 338. It can be seen from FIG. 5 that transmitter portion 300 is able to multiplex two E3 signals and send them through a serial fiber link.

The receiver portion 400, shown in FIG. 6, is now described. Receiver portion 400 contains an optical receiver 404, which converts optical pulses from link 338 into electrical digital signals. The output of optical receiver 406 is connected to a mB/nB CODEC receiver 406. In the present embodiment, receiver 406 is a TAXI receiver AM7969. TAXI receiver 406 generates a data strobe ("DSTRB") signal on a line 410, data on a parallel bus 412, over-wire voice communication on a line 416, and overhead channel on a line 418, based on the electrical digital signal received from optical receiver 404.

The DSTRB output of TAXI receiver 406 is coupled to a divide-by-N circuit 420, the output of which is connected to a PLL 422. PLL 422 also accepts an input from another divide-by-N circuit 426. The output of PLL 422 is a serial clock signal on line 423 for the E3 data stream generated by receiver portion 400.

The DSTRB line 410 and parallel bus 412 are coupled to the input terminals of a FIFO 430. The output of FIFO 430 are coupled to the inputs of parallel-to-serial circuits 438 and 440 via lines 436 and 434, respectively. Further, the inputs of divide-by-N circuit 426, FIFO 430 and parallel-to-serial circuit 432 are driven by the output of a divide-by-K circuit 442. Parallel-to-serial circuit 440 accepts (via line 423) an input from the clock signal generated by PLL 422. Parallel-to-serial circuit 438 shares the same clock with parallel-to-serial circuit 440. The clock signal on line 423 is also connected to the input terminal of divide-by-K circuit 442. Two serial signals, one corresponds to the E3A signal and the other corresponds to the E3B signal of FIG. 5, are generated by parallel-to-serial circuits 440 and 438.

At the TAXI receiver 406, the data strobe signal DSTRB will miss exactly one clock pulse for every N+1 clock cycles. Although this still produces a gapped clock signal, a simple divide-by-N circuit can easily remove the gaps and generate a jitter free receive clock signal since the gap is absorbed by the dividing operation. As shown in FIG. 6, the serial clock output on line 423 is jitter free because it is generated by a PLL which locks to a jitter free clock signal. The requirement of this PLL is not stringent since it does not have to keep tract of a variant clock signal. As a result, a clean clock signal can be easily produced by a regular and low cost PLL.

It can be seen from the above that receiver portion 400 can recover the two E3 signals present at the transmitter portion 300.

Figure 7:
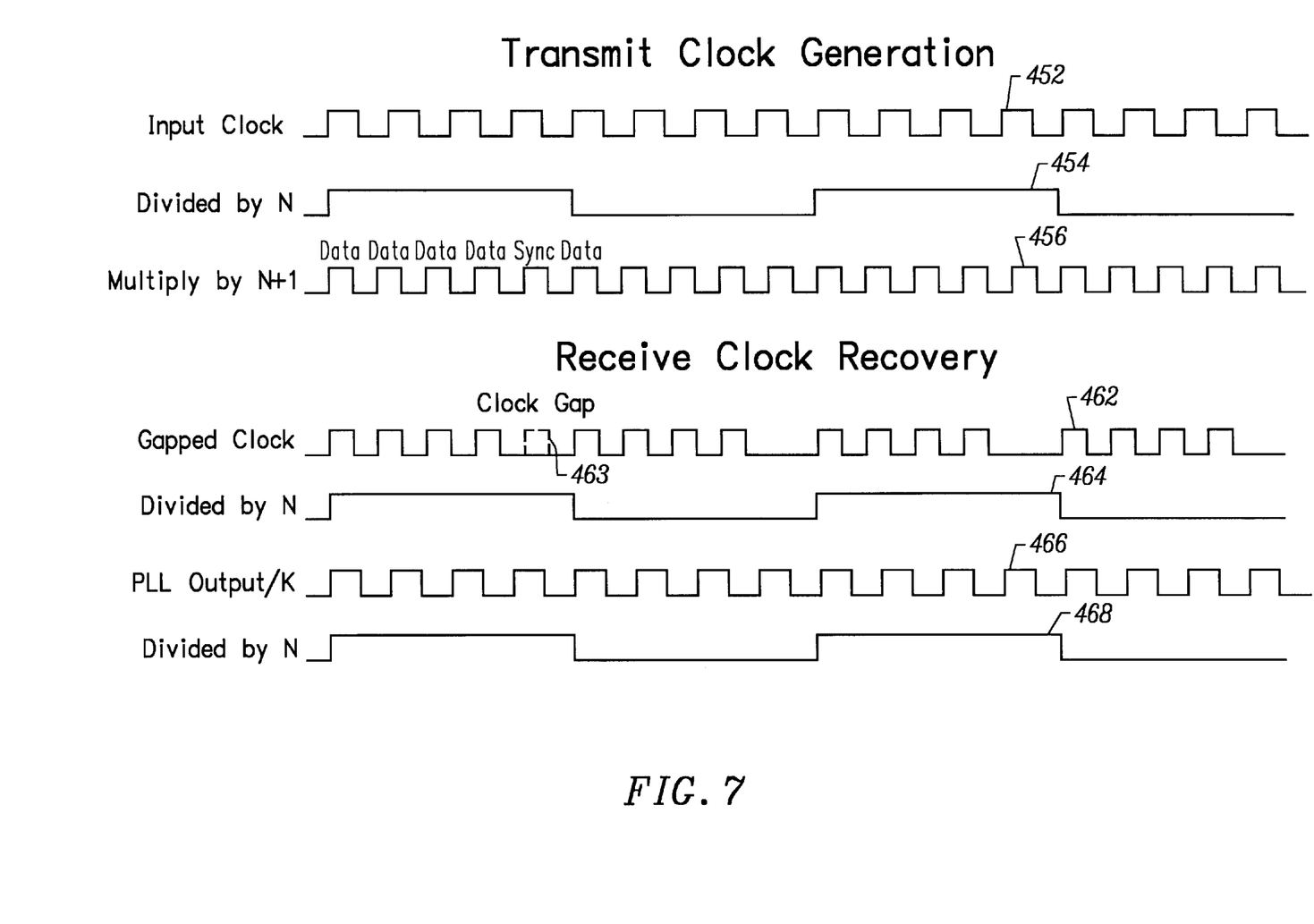
FIG. 7 is a timing diagram of signals at various points at the transmitter and receiver portions of FIGS. 5 and 6

In order to further explain the operation of transmitter portion 300 in FIG. 5 and receiver portion 400 in FIG. 6, timing diagram of various signals are shown in FIG. 7. Timing diagram 452 corresponds to the signal at a line 342 (i.e., the STRB input of TAXI transmitter 314) of FIG. 5. Timing diagram 454 corresponds to the signal at the input of PLL 330 of FIG. 5. Timing diagram 456 corresponds to the signal at the output of PLL 330 of FIG. 5. Timing diagram 462 corresponds to the signal at line 410 of FIG. 6. Clock gaps (e.g., dashed pulse 463) can be seen in timing diagram 462. Timing diagram 464 corresponds to the signal at the output of divide-by-N circuit 420 of FIG. 6. Timing diagram 466 corresponds to the signal at the output of divide-by-K circuit 442 of FIG. 6. Timing diagram 468 corresponds to the signal at the output of divide-by-N circuit 426 of FIG. 6.

Figure 8A:
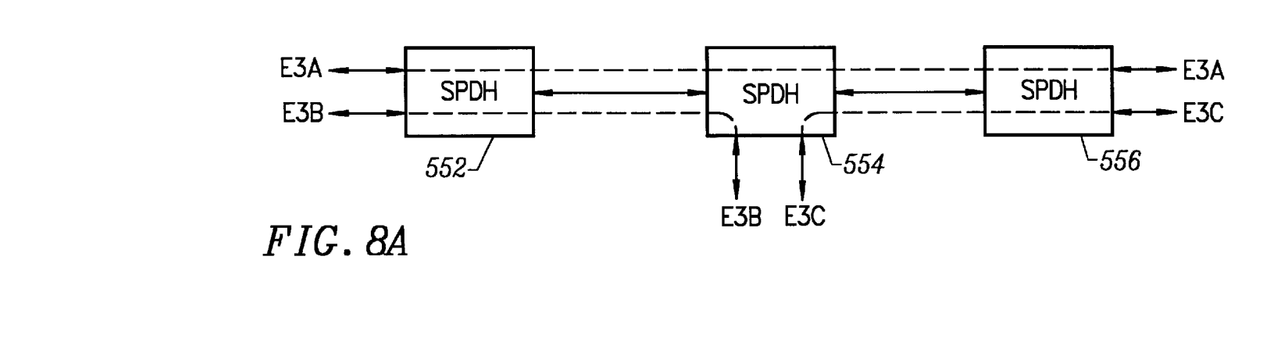
FIGS. 8A and 8B are block diagrams showing the implementation of an "add and drop" system of the present invention
Figure 8B:
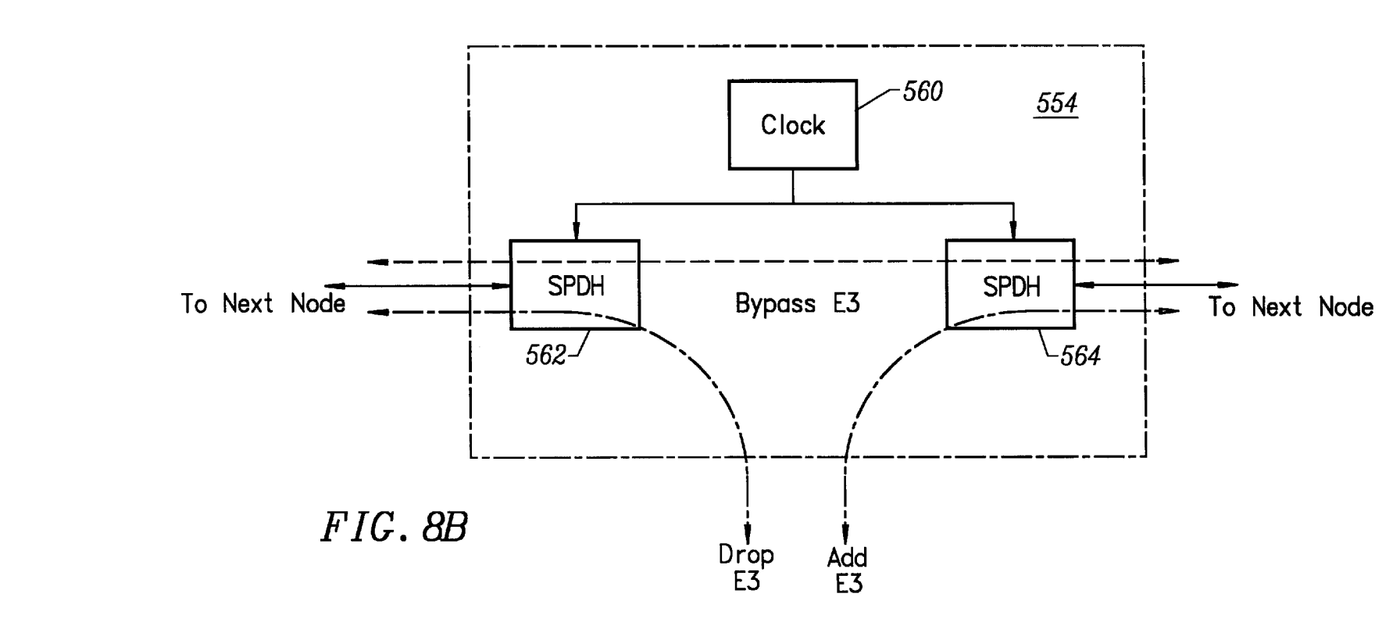

With the multiple PDH data streams being synchronously multiplexed with a single clock, and transmitted over optical fiber using SPDH technology, it is possible to add and drop one or more of the PDH data streams. FIG. 8A shows these capability of the SPDH. It shows three SPDH systems 552, 554 and 556 located at different locations. Data can be add and drop at system 554. FIG. 8B is a detailed block diagram of system 554. It contains a clock 560 connected to two SPDH devices 562 and 564. The add and drop feature is very important in the telecommunication deployment where the equipment in the middle acts as a repeater for the down stream equipment and at the same time serve the users around the area. Compared to the prior art PDH add and drop configuration, there is only one multiplexer at any given location where data is added or dropped from the main transmission facility.

To extend the add and drop functions a little further, one can construct a self-healing ring using SPDH technology. Self-healing ring is a special network design technique that several communication equipment are connected in a ring fashion such that any data traffic originated from one point always has two routes to the destination. In such configuration, the data always has an alternative route, so that in the event of equipment failure or cable cut, the communication can still continue. Although self healing ring is not new, it has never been used in a PDH communication systems.

Figure 9:
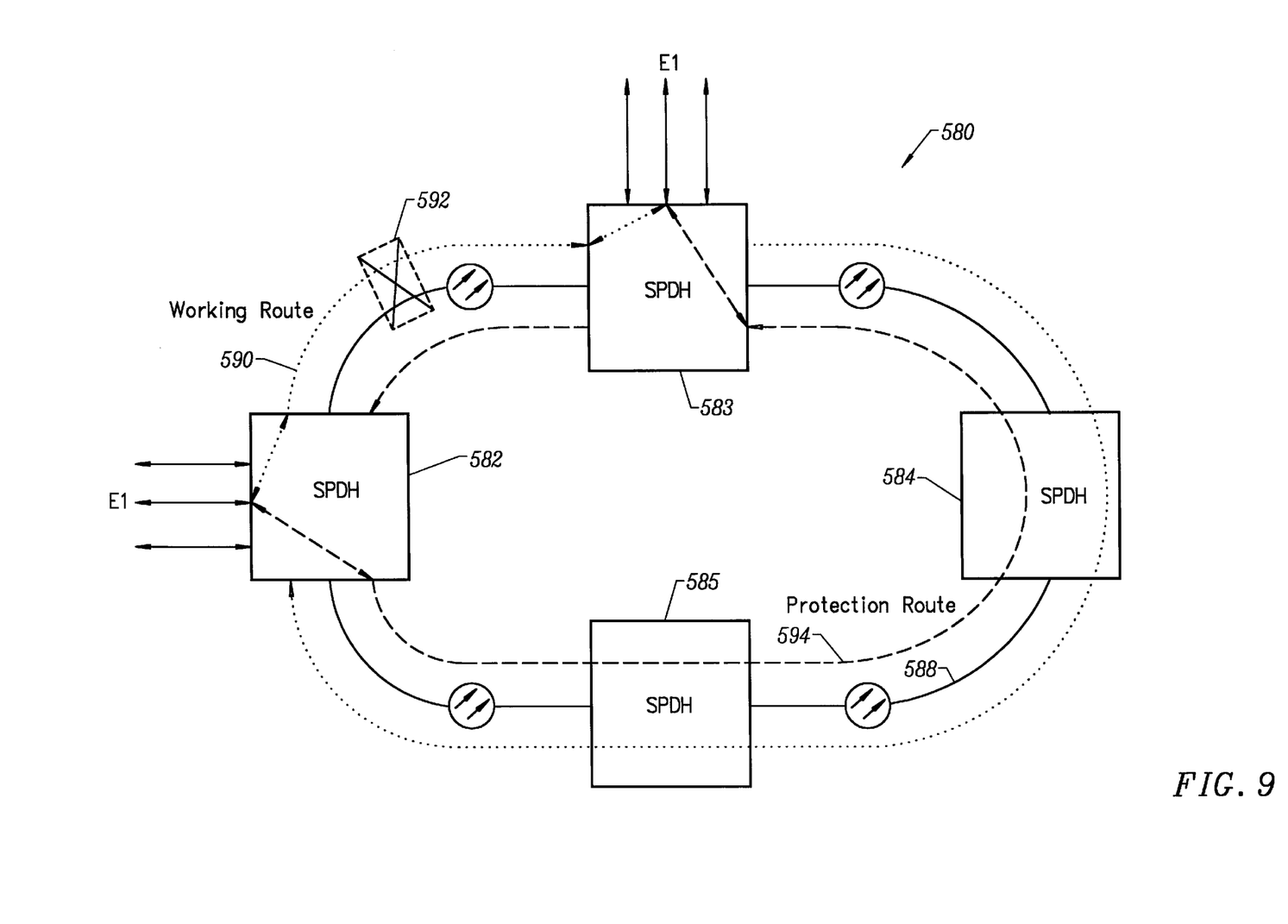
FIG. 9 is a block diagram showing a self-healing ring application of the present invention.

FIG. 9 is a illustration of SPDH used in a ring configuration 580. It shows a plurality of SPDH devices 582–585 connected by a physical ring 588. Configuration 580 contains a logical working route 590. If this route malfunctions, e.g., because the route at location 592 is cut, SPDH devices 582 and 583 switch to a protection route 594. As a result, the ring continues to function.

The invention now being fully described, it will be apparent to one of ordinary skill in the art that any changes and modifications can be made thereto without departing from the spirit or scope of the invention as set forth herein. Accordingly, the present invention is to be limited solely by the scope of the appended claims.

We claim:

1. A communication system comprising:

means for accepting at least two plesiochronous digital hierarchy (PDH) input signals, the PDH input signals to be combined through at least two stages of the plesiochronous digital hierarchy; a dock;

a first converting means for converting said two plesiochronous digital hierarchy input signals into a first and a second set of parallel data, said two sets of parallel data being synchronized by said clock through said at least two stages of the plesiochronous digital hierarchy without stuffing bits for synchronizing the first and second set of parallel data; and an encoder for accepting said first and said second sets of parallel data and for generating a serial output representative of said two PDH input signals.

2. The communication system of claim 1 further comprising an optical transmitter for coupling said serial output to an optical communication medium.

3. The communication system of claim 1 wherein said encoder comprises a mB/nB digital transmitter.

4. The communication system of claim 1 further comprising:

a decoder for accepting a serial input and for generating at least two sets of parallel date corresponding to said serial input; and means for converting said two sets of parallel data generated by said decoder into two separate PDH data each having a lower signaling rate than said serial input.

5. The communication system of claim 4 wherein said decoder comprises a mB/nB digital receiver.

6. The communication system of claim 1 wherein said first converting means further comprises two serial to parallel circuits controlled by said clock.

7. The communication system of claim 2 further comprising:

an optical receiver for generating a serial signal from signal transmitted on said optical communication medium;

a decoder for accepting said serial signal and for generating at least two sets of parallel data corresponding to said serial signal;

means coupled to said decoder for generating a recovered clock signal; and a second converting means for converting said two sets of parallel data generated by said decoder into two separate PDH data streams each having a lower signaling rate than said serial signal.

8. The communication system of claim 7 wherein said encoder comprises a mB/nB digital transmitter and said decoder comprises a mB/nB digital receiver.

9. The communication system of claim 7 wherein said first converting means further comprises two serial to parallel circuits controlled by said clock.

10. The communication system of claim 9 wherein said second converting means further comprises two parallel to serial circuits controlled by said recovered clock signal.

* * * * *